United States Patent
Yu et al.

(10) Patent No.: US 11,835,116 B1
(45) Date of Patent: Dec. 5, 2023

(54) INNER CIRCULATION BALL SCREW

(71) Applicant: HIWIN TECHNOLOGIES CORP., Taichung (TW)

(72) Inventors: Szu-Wei Yu, Taichung (TW); Chih-Ching Tsai, Taichung (TW); Shang-Hua Tsai, Taichung (TW)

(73) Assignee: HIWIN TECHNOLOGIES CORP., Taichung (TW)

( * ) Notice: Subject to any disclaimer, the term of this patent is extended or adjusted under 35 U.S.C. 154(b) by 0 days.

(21) Appl. No.: 17/991,570

(22) Filed: Nov. 21, 2022

(51) Int. Cl.
*F16H 25/20* (2006.01)
*F16H 25/22* (2006.01)

(52) U.S. Cl.
CPC ................. *F16H 25/2214* (2013.01)

(58) Field of Classification Search
CPC ......... F16H 25/2214; F16H 2025/2242; F16H 25/2003; F16H 25/2219; F16H 25/2427; F16H 25/2015; F16H 25/24
See application file for complete search history.

(56) References Cited

U.S. PATENT DOCUMENTS

| 5,974,908 A * | 11/1999 | Shirai ................. F16H 25/2219 74/424.87 |
| 2013/0133453 A1* | 5/2013 | Chen ................... F16H 25/2223 74/424.86 |
| 2018/0073616 A1* | 3/2018 | Kawaguchi ............. B22F 5/106 |

FOREIGN PATENT DOCUMENTS

| JP | 6444760 B2 | 12/2018 |
| KR | 20210001501 U * | 7/2021 |
| WO | WO-2013112597 A1 * | 8/2013 | ......... F16H 25/2214 |

* cited by examiner

*Primary Examiner* — Zakaria Elahmadi
(74) *Attorney, Agent, or Firm* — MUNCY, GEISSLER, OLDS & LOWE, PC (57) ABSTRACT

An inner circulation ball screw includes a screw shaft, a nut, and a return member. The nut is disposed on the screw shaft to form a load path with the screw shaft. The return member is disposed in an accessory slot of the nut to form a non-load path connected with the load path to form a circulation path for circulation of balls. The return member has a ball-discharging channel provided with one end connected with an ineffective thread section of the nut and the other end communicating with a ball-discharging hole of the nut. Therefore, the balls are allowed to move to the outside of the nut through the ball-discharging channel and the ball-discharging hole for preventing the balls from being stuck in the ineffective thread section, thereby solving the problems of high resistance and damaging to related accessories.

6 Claims, 9 Drawing Sheets

INNER CIRCULATION BALL SCREW

BACKGROUND OF THE INVENTION

1. Field of the Invention

The present invention relates to a ball screw and more particularly, to an inner circulation ball screw.

2. Description of the Related Art

Figure 1:
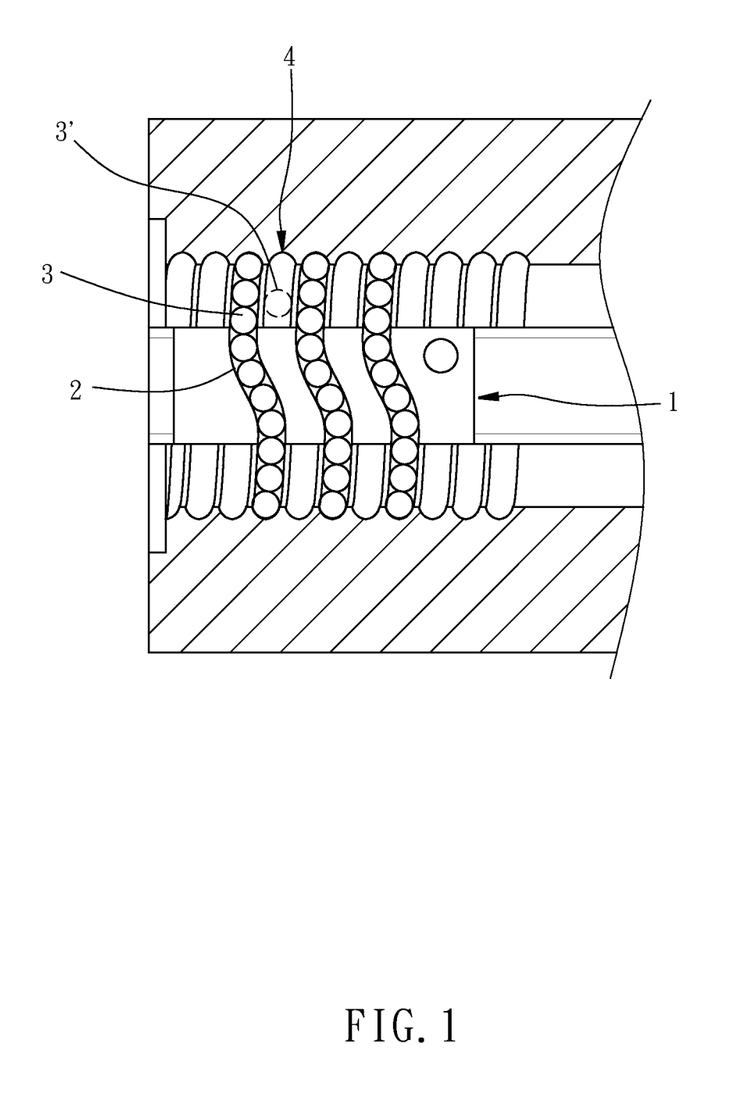
FIG. 1 is a schematic drawing of a conventional return member assembled with a nut according to a prior art.

As far as an inner circulation ball screw is concerned, if it is used in small lead situation, as shown in FIG. 1, the return groove 2 of the return member 1 may have an interrupted-thread design for avoiding damaging to the return member 1 due to the thin wall thickness between the two return grooves 2. However, when the return member 1 having the interrupted-thread design is assembled with the balls 3, the assembler needs to be very careful to keep the balls 3 from dropping out of the return grooves 2, but even so, some balls 3 still fall to an ineffective section 4 between the two adjacent return grooves 2 to form ineffective balls 3'. Once the ineffective balls 3' are stuck in the ineffective section 4, it is difficult for the assembler to take them out, causing high operational resistance and damaging to related accessories (such as the screw shaft or the nut). In other words, it is time-consuming and inconvenient for the conventional return member 1 to be assembled with balls 3.

Japan Patent No. 6444760 discloses a return member having two arm portions provided with a recycling port and a discharge port. The recycling port is used for recycling lubrication oil, and the discharge port is used for discharging lubrication oil. They are not used for the passage of balls, and therefore the problem that the balls are stuck in the ineffective section cannot be solved.

SUMMARY OF THE INVENTION

It is a primary objective of the present invention to provide an inner circulation ball screw, which improves assembly efficiency.

To attain the above objective, the inner circulation ball screw of the present invention comprises a screw shaft, a nut, a return member, and a plurality of balls. The screw shaft has an external thread. The nut is sleeved on the screw shaft so as to be movable along the axial direction of the screw shaft, and the nut has an internal thread, an accessory slot radially communicating with the internal thread, and a ball-discharging hole radially communicating with the accessory slot. A load path is formed by the internal thread of the nut and the external thread of the screw shaft. The return member is disposed in the accessory slot of the nut, and the return member has a return groove at an inner surface thereof connected with the internal thread of the nut. A non-load path is formed by the return groove of the return member and the external thread of the screw shaft. The non-load path is connected with the load path to form a circulation path for circulation of the balls. Further, the return member has a ball-discharging channel neighboring to the return groove and passing through the inner and outer peripheral surfaces of the return member. The ball-discharging channel has one end connected with an ineffective thread section of the internal thread of the nut and the other end communicating with the ball-discharging hole of the nut.

It can be seen from the above that the inner circulation ball screw of the present invention allows the ineffective balls dropping out of the return groove to reach the ball-discharging hole through the ball-discharging channel and then discharge out of the nut through the ball-discharging hole. After the assembly of all balls is completed, the ball-discharging hole is covered up by using a cover. By this way, the problems of high resistance and damaging to related accessories caused by the ineffective balls stuck inside the nut can be solved.

Preferably, the return member includes two said ball-discharging channels having opposite extending directions and arranged in a staggered manner. Thus, one of the ball-discharging channels allows the ineffective balls to move out of the nut.

Preferably, the ball-discharging channel has an inlet formed at the inner surface of the return member, and on outlet formed at an outer surface of the return member and communicating with the ball-discharging hole of the nut. By this way, the ineffective balls can enter the ball-discharging channel from the inlet and reach the ball-discharging hole through the outlet.

Preferably, the return member further includes a guiding protrusion neighboring to the inlet for guiding the ineffective balls to enter the ball-discharging channel.

Preferably, a first recess is provided at an inner surface of the nut, and a second recess is provided at the inner surface of the return member. The first recess and the second recess are connected with each other to form an inlet of the ball-discharging channel. The ball-discharging channel further has an outlet formed at an outer surface of the return member and communicating with the ball-discharging hole of the nut. By this way, the ineffective balls can enter the ball-discharging channel from the inlet and reach the ball-discharging hole through the outlet.

Preferably, a cover is mounted in the ball-discharging hole of the nut for covering up the ball-discharging hole.

Other advantages and features of the present invention will be fully understood by reference to the following specification in conjunction with the accompanying drawings, in which like reference signs denote like components of structure.

DETAILED DESCRIPTION OF THE INVENTION

Figure 2:
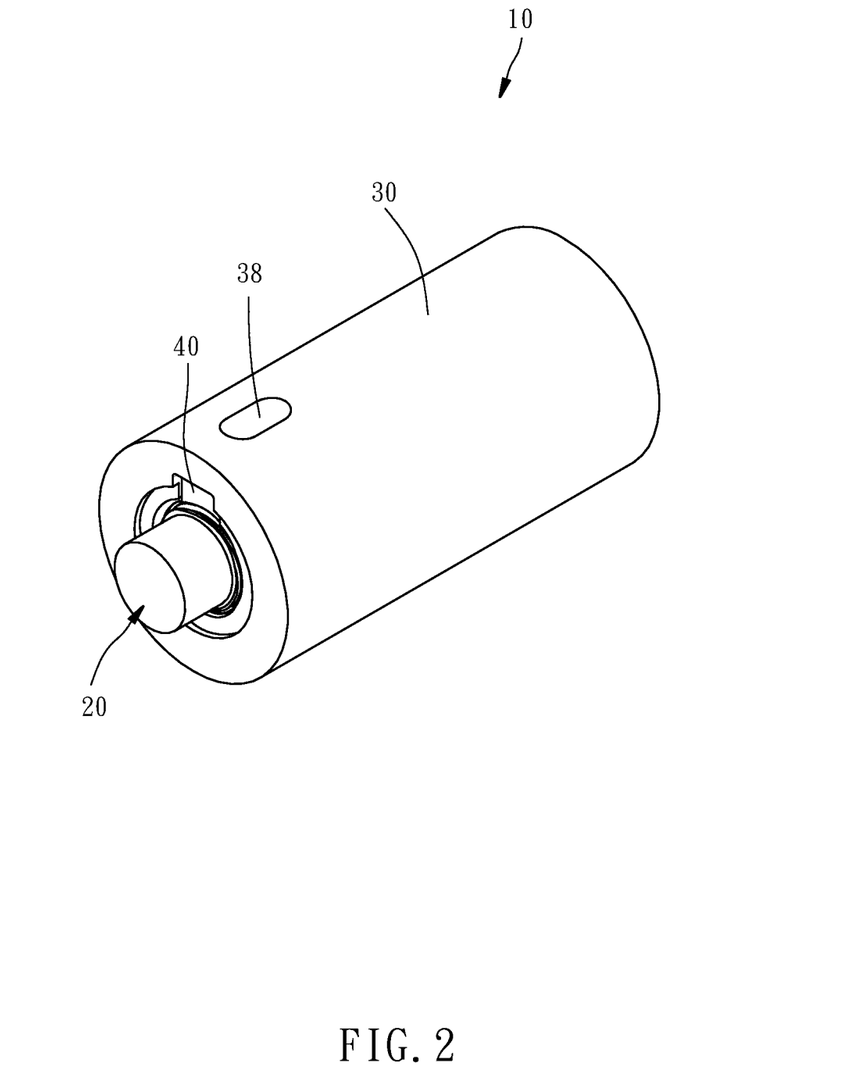
FIG. 2 is a perspective view of an inner circulation ball screw according to a first embodiment of the present invention.
Figure 3:
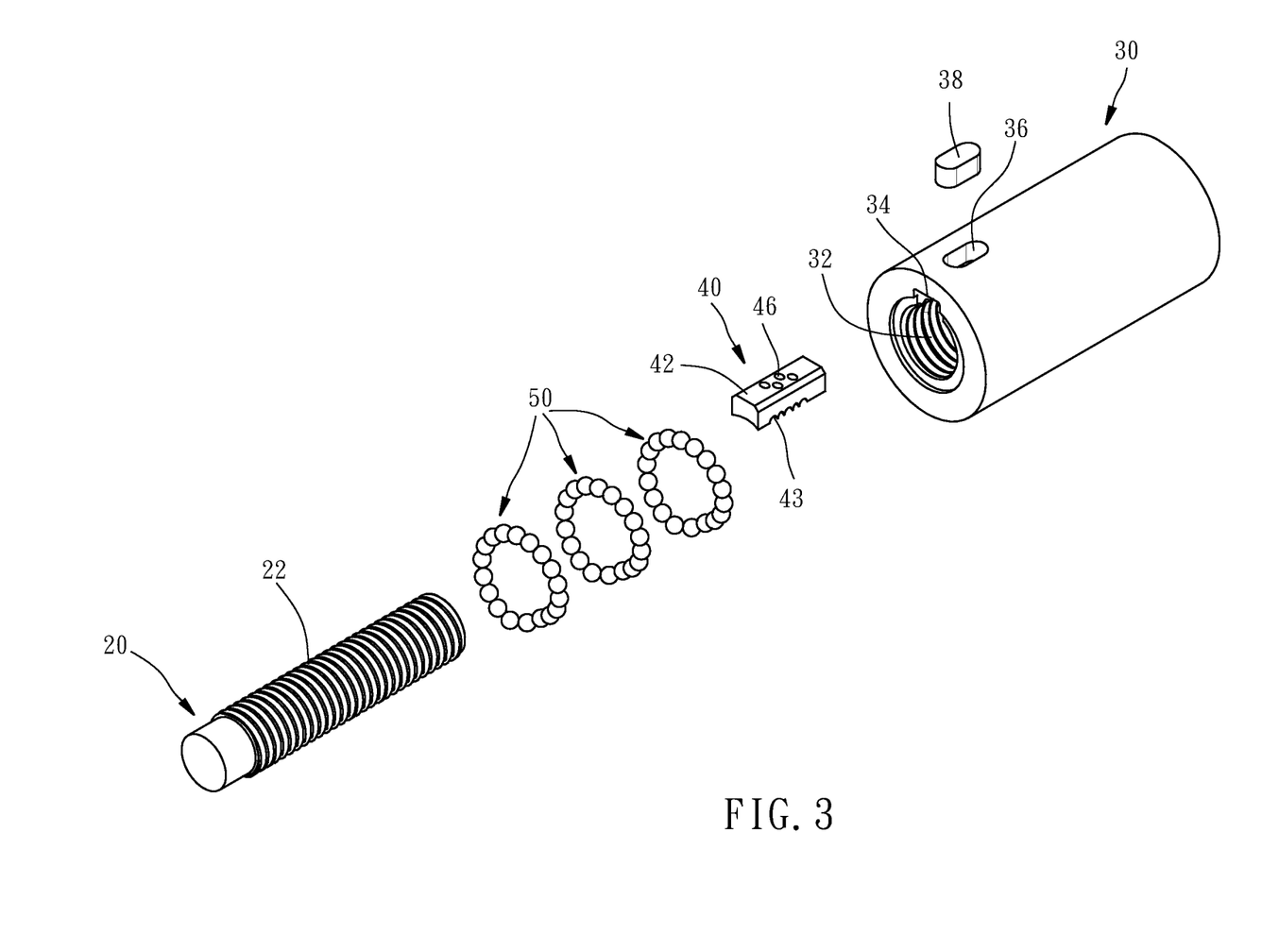
FIG. 3 is an exploded view of the inner circulation ball screw according to the first embodiment of the present invention.

Referring to FIGS. 2 and 3, an inner circulation ball screw 10 according to a first embodiment of the present invention comprises a screw shaft 20, a nut 30, a cover 38, a return member 40, and a plurality of balls 50.

The outer surface of the screw shaft 20 has an external thread 22 extending the axial direction of the screw shaft 20.

Figure 4:
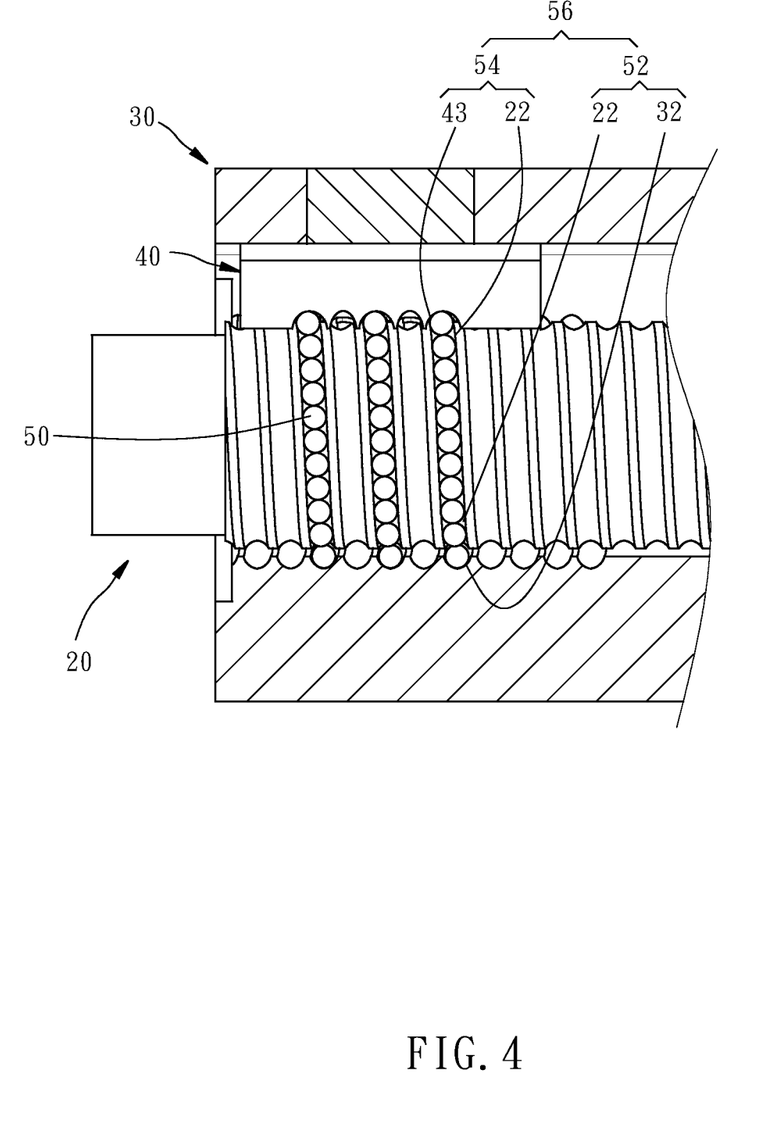
FIG. 4 is a sectional view of the inner circulation ball screw according to the first embodiment of the present invention.

The nut 30 is sleeved on the screw shaft 20 so as to be movable along the axial direction of the screw shaft 20. The inner surface of the nut 30 has an internal thread 32 and an accessory slot 34 radially communicating with the internal thread 32. As shown in FIG. 4, a load path 52 is formed by the internal thread 32 of the nut 30 and the external thread 22 of the screw shaft 20. In addition, the nut 30 further has a ball-discharging hole 36 passing through the inner and outer surfaces thereof and radially communicating with the accessory slot 34.

The cover 38 can, but not limited to, be mounted in the ball-discharging hole 36 of the nut 30 for covering up the ball-discharging hole 36 by fitting, gluing or other way.

Figure 5:
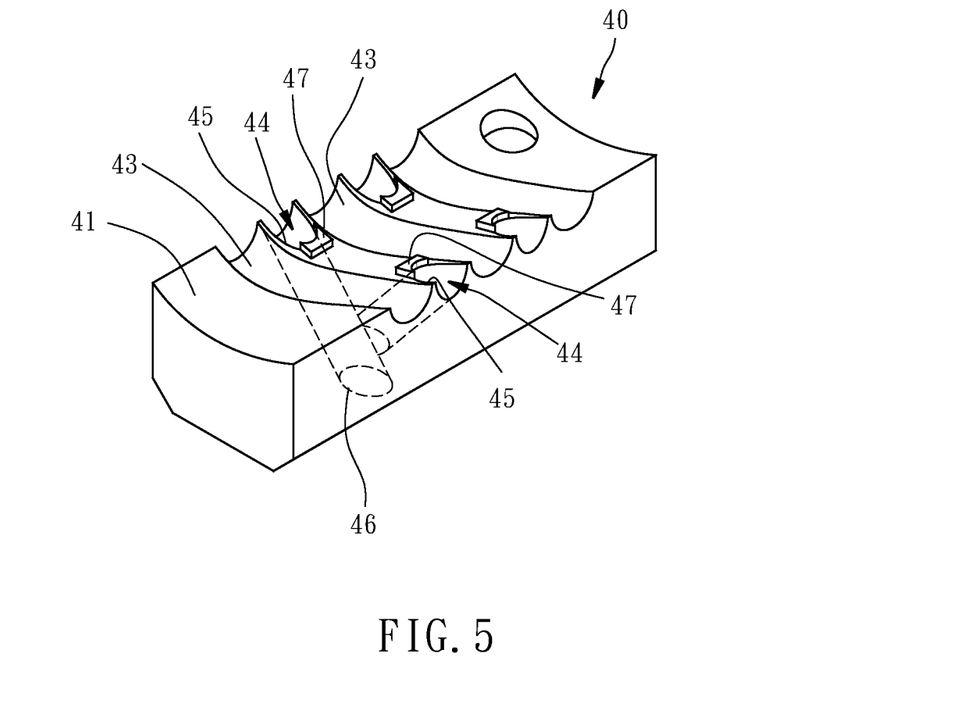
FIG. 5 is a top perspective view of a return member provided by the inner circulation ball screw according to the first embodiment of the present invention.
Figure 6:
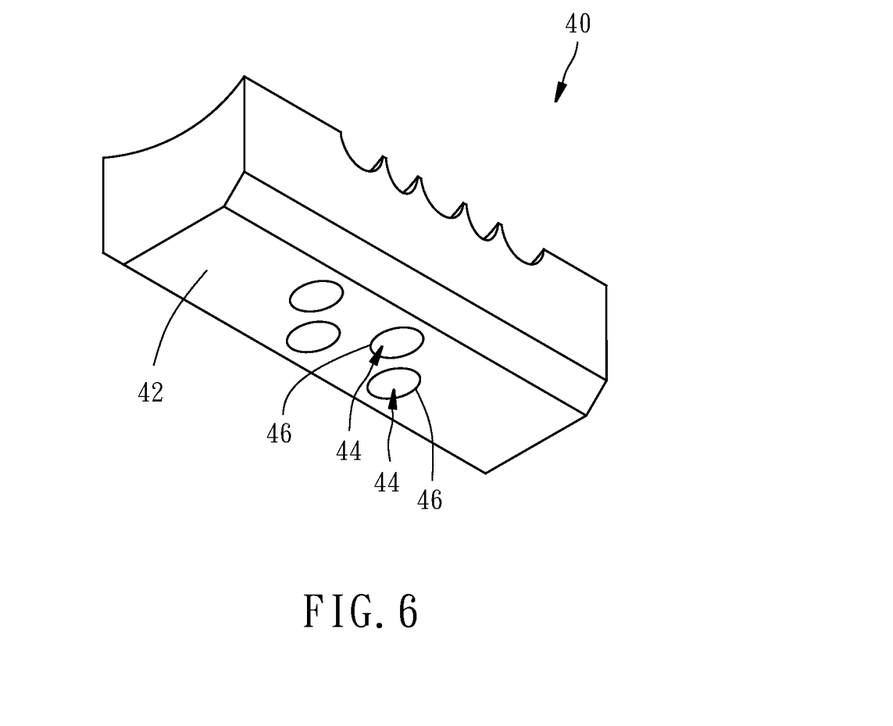
FIG. 6 is a bottom perspective view of the return member provided by the inner circulation ball screw according to the first embodiment of the present invention.
Figure 7:
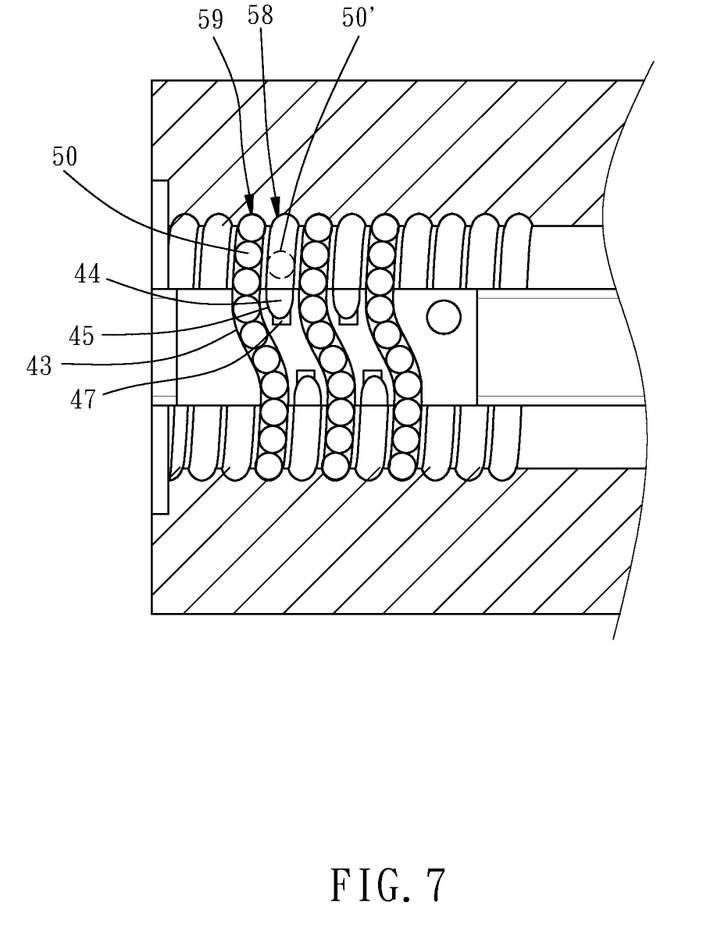
FIG. 7 is a partially sectional view of the inner circulation ball screw according to the first embodiment of the present invention, in which the shaft screw is not shown.

The return member 40 is disposed in the accessory slot 34 of the nut 30. As shown in FIGS. 5 and 6, the inner surface 41 of the return member 40 has three return grooves 43 arranged in a spaced manner and connected with the internal thread 32 of the nut 30. As shown in FIG. 4, a non-load path 54 is formed by the return grooves 43 of the return member 40 and the external thread 22 of the screw shaft 20. The non-load path 54 is connected with the load path 52 to form a circulation path 56 for circulation of the balls 50. In addition, as shown in FIGS. 5 and 6, the return member 40 further has two ball-discharging channels 44 (actually, at least one is sufficient) between the two adjacent return grooves 43. One end of each of the ball-discharging channels 44 is connected with an ineffective thread section 58 of the internal thread 32 of the nut 30 (as shown in FIG. 7), and the other end of each of the ball-discharging channels 44 communicating with the ball-discharging hole 36 of the nut 30. The ball-discharging channels 44 have opposite extending directions and are arranged in a staggered manner. The ball-discharging channels 44 are penetrated through the inner and outer surfaces 41, 42 of the return member 40 and each have an inlet 45 and an outlet 46. In this embodiment, the inlet 45 is formed at the inner surface 41 of the return member 40, and the outlet 46 is formed at the outer surface 42 of the return member 40. As shown in FIG. 5, the inner surface 41 of the return member 40 has four guiding protrusions 47 neighboring to the inlets 47 in a one-to-one manner. To deserve to be mentioned, as shown in FIG. 7, the ineffective thread section 58 is an area through which the balls 50 rolling between the screw shaft 20 and the nut 30 do not pass, and an effective thread section 59 is an area through which the balls 50 rolling between the screw shaft 20 and the nut 30 pass.

Figure 8:
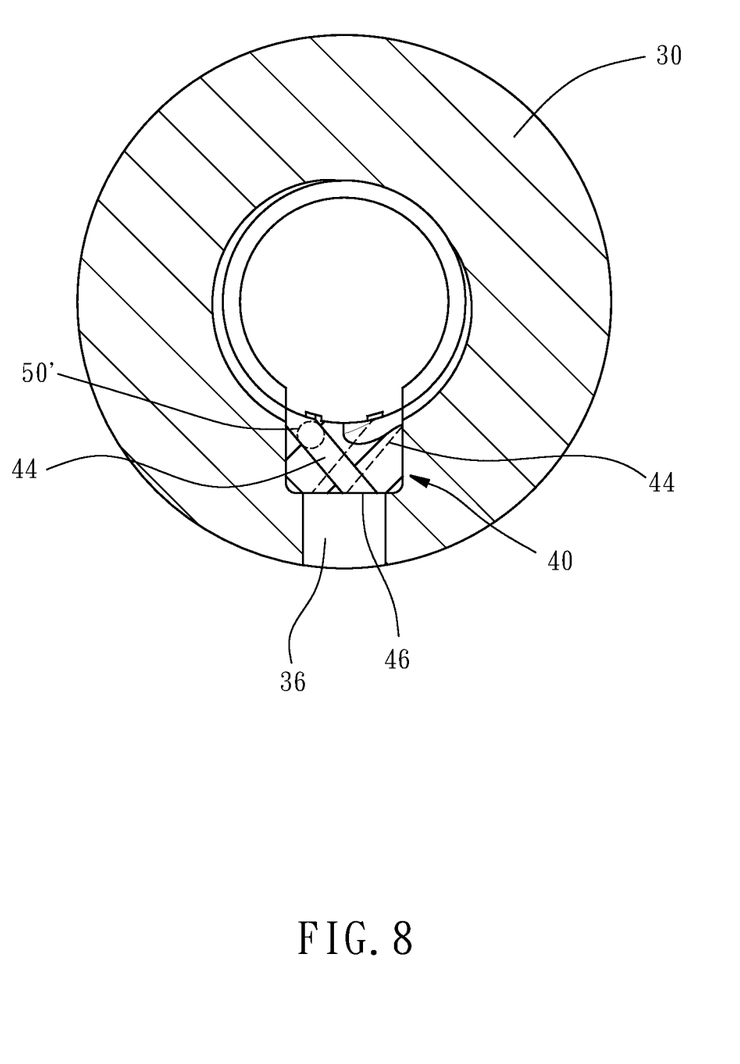
FIG. 8 is a radially sectional view of the inner circulation ball screw according to the first embodiment of the present invention, in which the shaft screw and the cover are not shown.

It can be seen from the above that when the balls 50 is assembled, an ineffective ball 50' is formed by the ball 50 stuck in the ineffective thread section 58 between the two adjacent return grooves 43. As shown in FIGS. 7 and 8, the ineffective ball 50' is guided by the guiding protrusion 47 to enter the ball-discharging channel 44 through the inlet 45, and then reaches the ball-discharging hole 36 through the outlet 46, and finally discharges out of the nut 30 through the ball-discharging hole 36. By this way, the problem caused by the ineffective ball 50' stuck in the ineffective thread section 58 can be solved. After the assembly of the balls 50 is completed, the cover 38 is used to cover up the ball-discharging hole 36 for preventing foreign objects from entering the nut 30.

Figure 9:
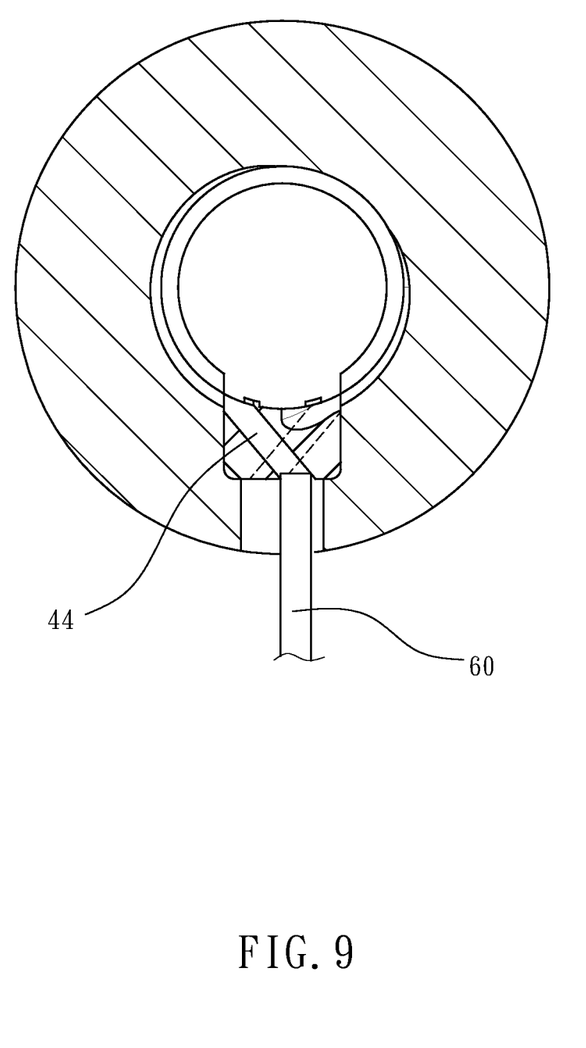
FIG. 9 is similar to FIG. 8, showing one end of a hollow tube is inserted into the ball-discharging channel.

On the other hand, in order to discharge the ineffective ball 50' out of the nut 30 more smoothly, as shown in FIG. 9, a hollow tube 60 is provided to insert into the ball-discharging channel 44 through the outlet 46 for allowing the assembler to blow or inhale into the ball-discharging channel 44. The ineffective ball 50' can be discharged faster out of the nut 30 by air pressure, thereby enhancing assembly efficiency.

Figure 10:
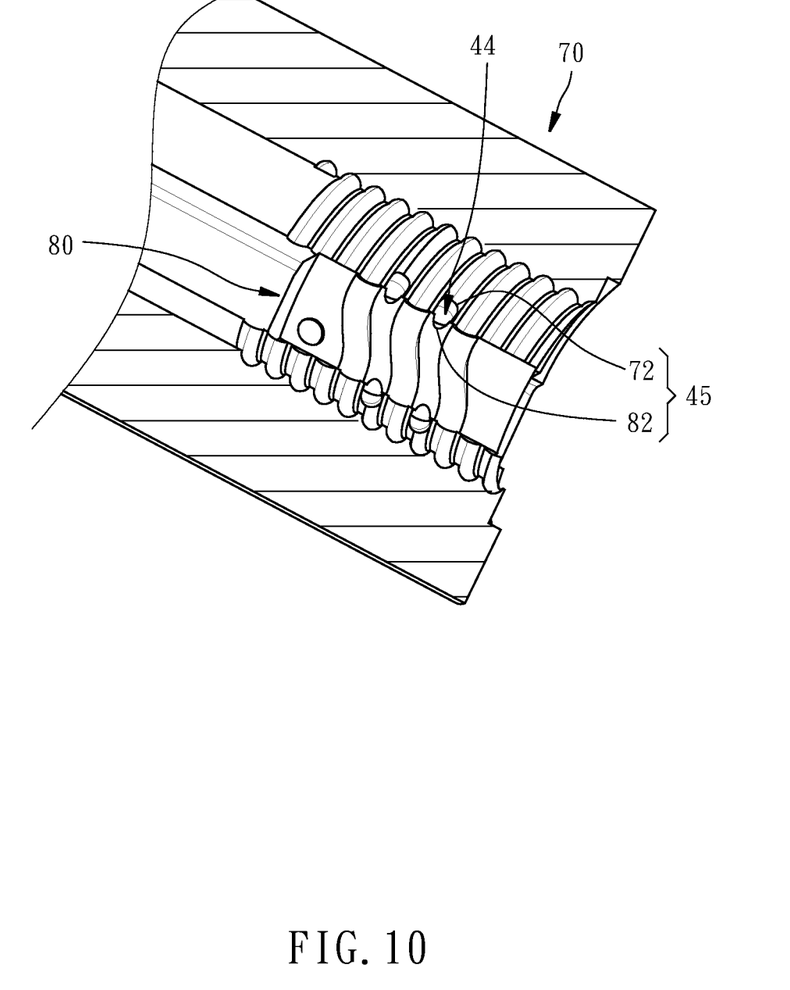
FIG. 10 is a partially sectional view of the inner circulation ball screw according to a second embodiment of the present invention, in which the shaft screw is not shown.

It needs to be added here that in the aforesaid embodiment, the inlet 45 of the ball-discharging channel 44 is formed at the inner surface 41 of the return member 40; however, the inlet 45 of the ball-discharging channel 44 can be formed between the nut 70 and the return member 80. As shown in FIG. 10, the inner surface of the nut 70 has a first recess 72, and the inner surface of the return member 80 has a second recess 82. The first recess 72 and the second recess 82 are connected with each other to form the inlet 45 of the ball-discharging channel 44. Such a structural design also can allow the ineffective ball 50' to enter the ball-discharging channel 44 through the inlet 45 for achieving ball-discharging effect.

As indicated above, the inner circulation ball screw 10 of the present invention allows the ineffective balls 50 stuck in the ineffective thread section 58 to discharge out of the nut 30 from the ball-discharging channel 44 through the ball-discharging hole 36. Therefore, the problems of high resistance and damaging to related accessories caused by the ineffective balls 50 stuck in the ineffective thread section 58 can be solved, thereby achieving ball-discharging effect.

What is claimed is:

1. An inner circulation ball screw, comprising:
    a screw shaft having an external thread;
    a nut sleeved on the screw shaft so as to be movable along an axial direction of the screw shaft, the nut having an internal thread forming a load path with the external thread of the screw shaft, the nut further having an accessory slot radially communicating with the internal thread and a ball-discharging hole radially communicating with the accessory slot;
    a return member disposed in the accessory slot of the nut and having a return groove at an inner surface thereof connected with the internal thread of the nut, the return groove of the return member and the external thread of the screw shaft forming a non-load path connected with the load path to form a circulation path, the return member further has at least one ball-discharging channel neighboring to the return groove and passing through inner and outer surfaces of the return member, the ball-discharging channel having one end connected with an ineffective thread section of the internal thread of the nut and the other end communicating with the ball-discharging hole of the nut; and
    a plurality of balls disposed in the circulation path.

2. The inner circulation ball screw as claimed in claim 1, wherein the return member includes two said ball-discharging channels having opposite extending directions and arranged in a staggered manner.

3. The inner circulation ball screw as claimed in claim 1, wherein the ball-discharging channel has an inlet formed at the inner surface of the return member, and an outlet formed at an outer surface of the return member and communicating with the ball-discharging hole of the nut.

4. The inner circulation ball screw as claimed in claim 3, wherein the return member further includes a guiding protrusion neighboring to the inlet.

5. The inner circulation ball screw as claimed in claim 1, wherein a first recess is provided at an inner surface of the nut, and a second recess is provided at the inner surface of the return member; the first recess and the second recess are connected with each other to form an inlet of the ball-discharging channel; the ball-discharging channel further has an outlet formed at an outer surface of the return member and communicating with the ball-discharging hole of the nut.

6. The inner circulation ball screw as claimed in claim 1, wherein a cover is mounted in the ball-discharging hole of the nut for covering up the ball-discharging hole.

* * * * *